Jan. 28, 1969  O. J. B. ORWIN  3,424,112
CONVEYORS

Filed Jan. 11, 1967  Sheet 1 of 7

INVENTOR.
OLAF JOHN BARCLAY ORWIN
BY Kurt Kelman
AGENT

United States Patent Office 3,424,112
Patented Jan. 28, 1969

3,424,112
CONVEYORS
Olaf J. B. Orwin, Birmingham, England, assignor to Fisholow Products Limited, Birmingham New Road, Tipton, England, a British company
Filed Jan. 11, 1967, Ser. No. 608,613
Claims priority, application Great Britain, Jan. 22, 1966, 3,004/66
U.S. Cl. 104—172  2 Claims
Int. Cl. B61b 9/00, 13/00; E01b 25/26

ABSTRACT OF THE DISCLOSURE

This invention relates to conveyors of the kind including a pair of wheeled trolley supporting tracks which converge at a junction point, and is concerned with the transference of the trolleys from one track to the other at the junction point.

BACKGROUND OF THE INVENTION

Field of the invention

This invention relates to conveyors of the kind, herein called the kind specified, including a pair of wheeled trolley supporting tracks which converge at a junction point, a plurality of wheeled trolleys advanceable along said tracks, a powered conveyor element associated with each trolley supporting track and provided at intervals along its length with pairs of dogs, each pair comprising a rearmost driving dog and a foremost retarding dog respectively engageable with the rearwardly and forwardly directed faces of a driving abutment extending between the two dogs of a pair of dogs and mounted on each trolley to provide for controlled advancement of the trolleys by their associated conveyor element, the two dogs in each pair being displaceable relative to their associated conveyor element in a direction to permit of the driving abutment of a trolley being transferred at the junction point from the control of a pair of dogs of the conveyor element associated with one trolley supporting track to the control of a pair of dogs of a conveyor element associated with the other trolley supporting track.

Herein the expressions "rearmost" and "foremost," "rearwardly" and "forwardly" have reference to the designed direction of advancement of the trolleys.

Description of the prior art

In conveyors of the kind specified it is not possible for the driving dogs and retarding dogs to move rearwardly and forwardly respectively relative to the conveyor element beyond their normal trolley controlling positions to assist in the transfer of a trolley from the control of one conveyor element to the other at the junction point. Otherwise such dogs would be ineffective in performing their respective functions of driving the trolley in a forward direction and preventing, in the case of the retarding dog, a trolley from advancing forwardly relative to a conveyor element in an uncontrolled manner.

This limitation on the freedom of movement of the trolley dogs relative to their associated conveyor element introduces a difficulty arising from the fact that at the junction point between the two tracks, the two conveyor elements necessarily converge towards one another as they approach the junction point so that there is a possibility that a laterally directed side of the trolley driving abutment will engage the adjacent laterally directed side of either of the two dogs in each pair. It is apparent that, if such engagement should take place and the engaged lateral sides of the abutment and driving dog or retarding dog as the case may be, do not disengage, the two conveyor elements meeting at said juntcion point become jammed and the conveyor is damaged.

It is an object of the present invention to provide a new or improved form of conveyor of the kind specified in which the foregoing undesired possibility is avoided.

Summary of the invention

According to the present invention the retarding dogs in addition to the driving dogs and the trolley driving abutment are each formed on their laterally directed sides with both forwardly and rearwardly directed abutment faces, which in a direction away from a vertical plane extending longitudinally and centrally of the associated trolley track are respectively inclined in a rearward and a forward direction so that the abutment faces of each of said lateral sides merge directly into one another to present a sharp guiding extremity intermediate the so merging forwardly and rearwardly directed abutment faces.

In such an arrangement it is impossible for either of the two laterally directed sides of a trolley driving abutment to jam against an adjacent laterally directed side of either a driving dog or a retarding dog.

In particular if a laterally directed side of a trolley driving abutment engages with an adjacent lateral side of either a driving dog or a retarding dog, necessarily either a forwardly or a rearwardly directed and inclined abutment face of a lateral side of the driving abutment will engage respectively with a rearwardly or a forwardly directed and inclined abutment face of either a driving or a retarding dog, with the result that the so interengaged inclined abutment faces slide relatively in a lateral direction over one another as a trolley advancing along one track converges in relation to the conveyor element and its associated dogs of the other trolley track, as each trolley approaches the junction point.

Thus, with the present invention there is no possibility of a laterally directed side of either the retarding dog or the driving dog of each pair of dogs becoming jammed against the adjacent laterally directed side of a trolley driving abutment.

Such jamming on the other hand does occur with the arrangement according to the prior specification, insofar as the laterally directed sides of each retarding dog of each pair of dogs are flat and are wholly unprovided with the above-mentioned rearwardly and forwardly directed inclined abutment faces, so that the lateral extremity of a trolley driving abutment becomes jammed against the flat lateral side of a retarding dog as the two trolley tracks and their associated conveyor elements converge towards one another at the junction point.

Brief description of the drawings

The invention is illustrated in the accompanying drawings, wherein.

*Description of the preferred embodiment*

Figure 1:
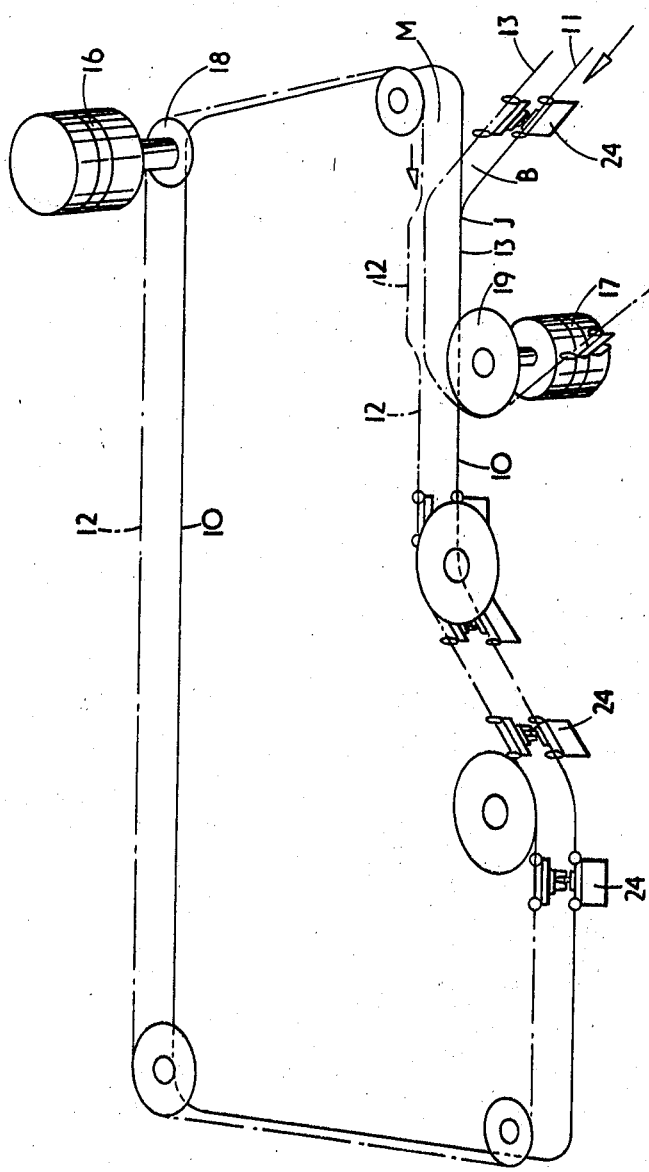
FIGURE 1 is a diagrammatic view of one form of conveyor embodying the present invention.
Figure 5:
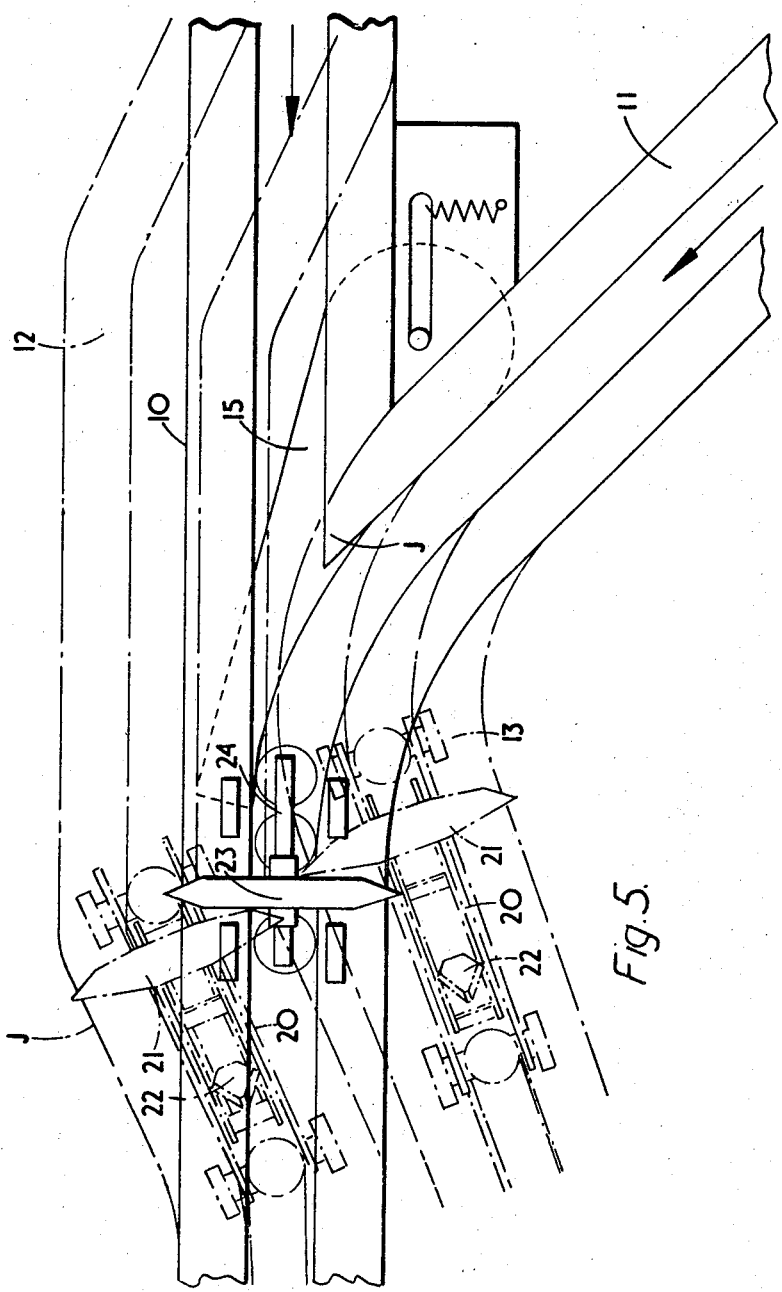
FIGURE 5 is a diagrammatic plan view showing the disposition of the two trolley tracks and the two conveyor elements at the junction between two trolley tracks, which is depicted diagrammatically in FIGURE 1.

Referring to the drawings and firstly to FIGURES 1 and 5 thereof, the conveyor there illustrated comprises a main conveyor portion M and a branch conveyor portion B, which converge towards one another to the junction joint J.

The two conveyor portions M, B, respectively embody trolley tracks 10, 11 above which are respectively disposed conveyor elements 12, 13 each in the form of an endless chain and each provided with a supporting track 12a, 13a respectively.

At the junction point J between the two trolley tracks 10, 11 there is provided a movable switch tongue 15 of known form so that trolleys advancing in the designed direction indicated by the arrows in FIGURES 1 and 5 can be fed into main trolley track 10 from the branch track 11 or else be allowed to advance along the main track 10 in the known manner.

The two endless chains 12, 13 are each driven from their own power source 16, 17 respectively, through driving sprockets 18, 19 and in order to avoid undue expense in the arrangement of the power means for driving the two chains, there is no special provision to ensure that the two chains are driven at precisely the same speed, which provision requires for precise synchronisation of the two power sources, in practice electric motors which then have to be provided with a complex form of control switch gear.

The two conveyor chains 10, 11 are each provided at intervals along their length with dependent housings 20, for pairs of trolley engaging dogs 21, 22. Each pair of dogs comprises a rearmost driving dog 21, and a foremost retarding dog 22, spaced apart in the direction of chain advancement and respectively engageable with the rearwardly and forwardly directed faces of a trolley driving abutment 23 in the form of a transverse bar mounted on the upper part of each of the load supporting trolleys 24. The arrangement is such that during the advancement of a trolley by one or the other of the two conveyor chains, except in the course of transference of a trolley from the control of one conveyor element to the other conveyor element at the junction point J, each trolley driving abutment 23 will always be disposed between the two dogs of each pair of dogs so that the associated trolleys will be advanced in a controlled manner.

Figure 2:
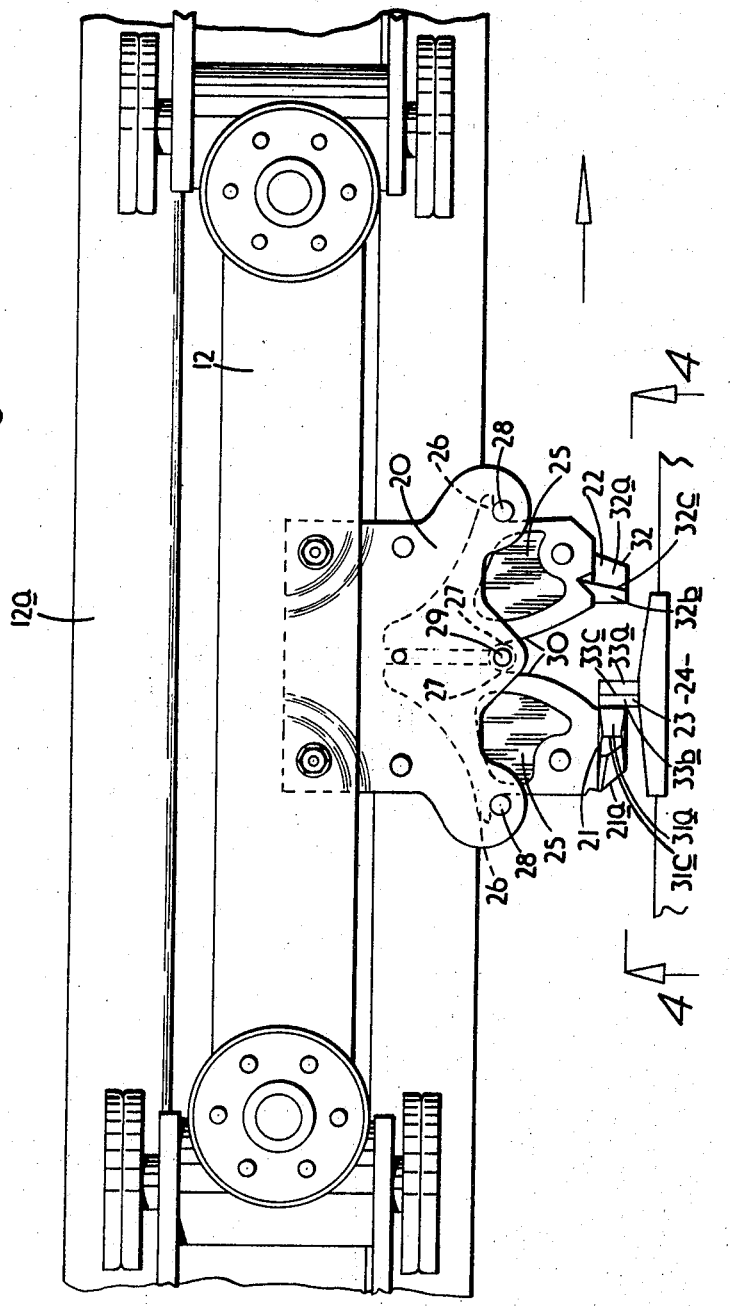
FIGURE 2 is a side elevation to an enlarged scale depicting part of the conveyor chain of the conveyor shown in FIGURE 1, together with a pair of dogs, and with the driving dog of such pair in driving engagement with a driving abutment of one of the trolleys.

Accordingly each driving dog 21 and each retarding dog 22 are so mounted in their housing 20 as to be respectively incapable of moving rearwardly and forwardly beyond their operative, i.e., trolley controlling, positions depicted in FIGURE 2.

The two dogs 21, 22, in each pair are further mounted in the known manner for vertical sliding movement in an upward direction from the position depicted in FIG. 2, and relative to their associated housing 20 so as to permit in the case of the driving dog of the drive from the conveyor element to the driven trolley 24 being disconnected, and also in the case of a driving dog 21 of a relatively faster advancing trolley driving abutment 23 passing beneath the driving dog, raising the same temporarily while so doing to reach the position depicted in FIG. 2; and in the case of a retarding dog 22 of a relatively faster advancing retarding dog passing over a driving abutment 23, again raising the dog temporarily in so doing, to permit of the driving abutment reaching the operative position depicted in FIG. 2.

Figure 3:
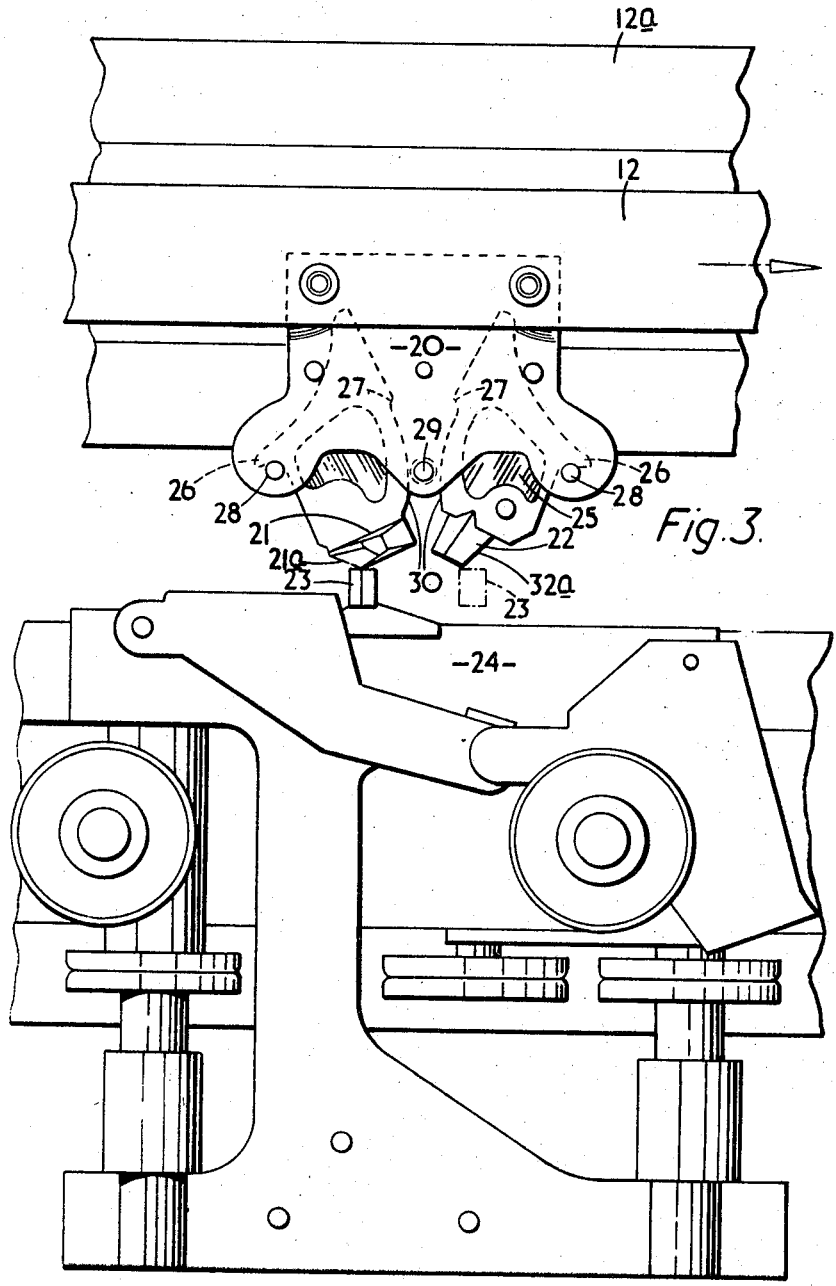
FIGURE 3 is a view similar to FIGURE 2 illustrating how a trolley driving abutment can move forwardly relative to a driving dog and rearwardly relative to a retarding dog, as such driving abutment moves into controlled engagement with the pair of dogs depicted in this figure.

Also to facilitate transference of a trolley from the control of one conveyor chain to the other at the junction point J, each driving dog 21 is mounted for forward movement in relation to its associated housing 20 and each retarding dog 21 is mounted for rearward movement in relation to its associated housing, as shown in FIG. 3.

For the above described purposes the two dogs 21 and 22 of each pair of dogs are carried upon the lower end of a stem 25 and are formed as portions integral with the associated stem. Each stem 25 intermediate its upper and lower ends has oppositely directed lugs 26, 27 which engage with the upper sides of transverse pins 28, 29, carried by the housing 20, the arrangement permitting of controlled vertical sliding movement of each dog and in addition the driving dog stems and the retarding dog stems are respectively provided with opposed convex faces 30, which engage with transverse pin 29 extending therebetween, to permit as shown in FIGURE 3 of the aforementioned forward and rearward movement of dogs 21, 22, respectively.

Figure 4:
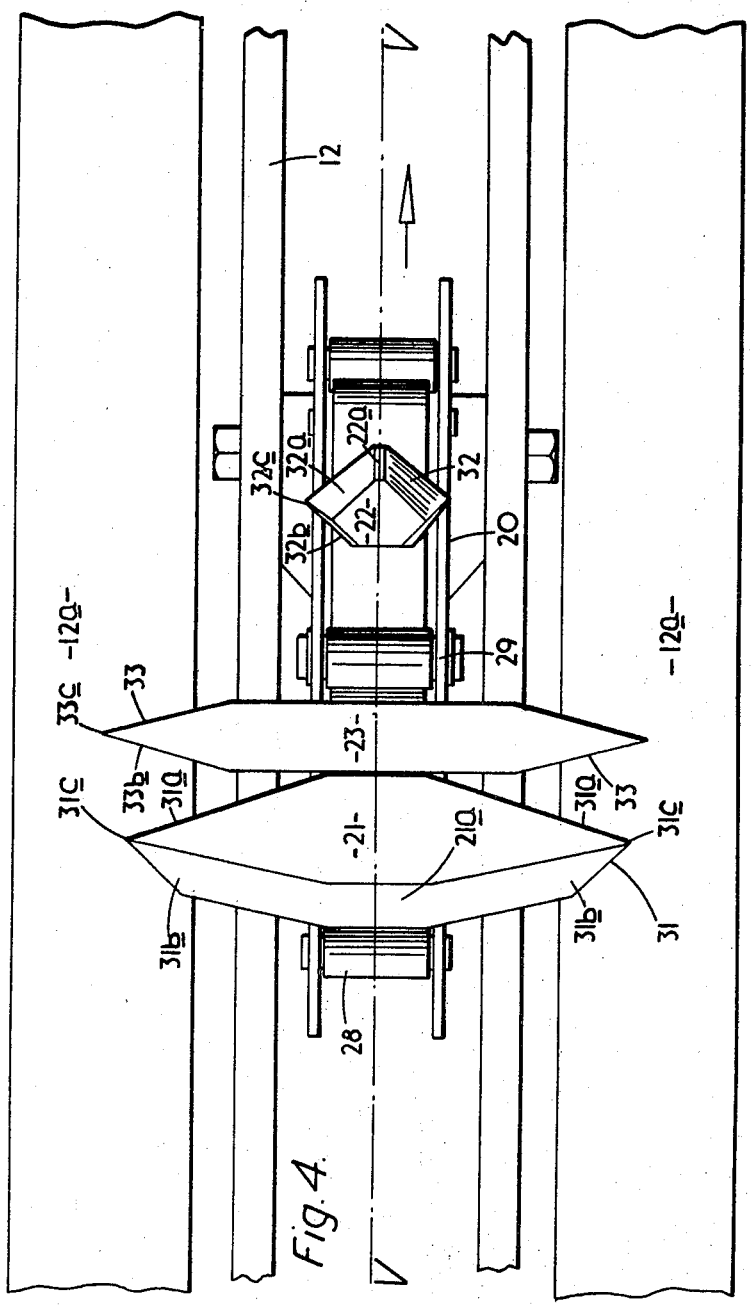
FIGURE 4 is a sectional view of the line 4—4 of FIGURE 2.

As shown in FIG. 4, each driving dog 21 is elongated in a direction which is transverse to the direction of advancement of the associated chain, while each retarding dog 22 has a lateral width very much less than that of each driving dog, so as only to extend a short distance in a lateral direction beyond the adjacent lateral face of its associated stem 25.

Necessarily each driving dog 21, each retarding dog 22 and each driving abutment 23 present laterally directed sides 31, 32, 33 respectively and each of these laterally directed sides is constituted by forwardly and rearwardly directed faces 31a, 31b in the case of dog 21; 32a, 32b in the case of dog 22; and 33a, 33b in the case of driving abutment 23 with each of these abutment faces formed on portions of the dogs themselves, i.e. on portions which are integral with the associated supporting stems 25.

The forward and rearwardly directed faces of the lateral sides of each of these three parts 21, 22, 23 are respectively inclined rearwardly and forwardly in a direction away from a vertical plane denoted by the line V—V in FIG. 4, which plane extends longitudinally and centrally of the associated trolley track, considering the latter horizontal, and with a trolley driving abutment 23 disposed between the two dogs of a pair as shown in FIGURE 4.

Each of these so inclined mutually adjacent faces on each lateral side of each part 21, 22, 23 merge into a laterally presented sharp guiding projection 31c, in the case of dog 21; 32c in the case of dog 22; and 33c in the case of abutment 33; each of these sharp guiding projections 31c, 32c, 33c being, in fact, constituted by a substantially vertically extending sharp edge. Each edge 31c, 32a, 33c need not be and would not in practice be of razor sharpness. Indeed it may be slightly rounded in cross sectional plan view, the essential requirement being that the width of each such edge in a direction parallel or substantially parallel to line V—V is so small as to prevent face to face jamming contact of a lateral side 33 of trolley driving abutment 23 with a lateral side 31 or 32 of one or the other of the two dogs of each pair of dogs when these lateral sides are brought into engagement with one another.

From the foregoing it will be understood that the abutment faces 32a, 32b, in the case of the retarding dogs 22, are as shown in FIG. 4 constituted by projections on each lateral side of the retarding dog, which projections are of triangular form as viewed in plan.

Figure 6:
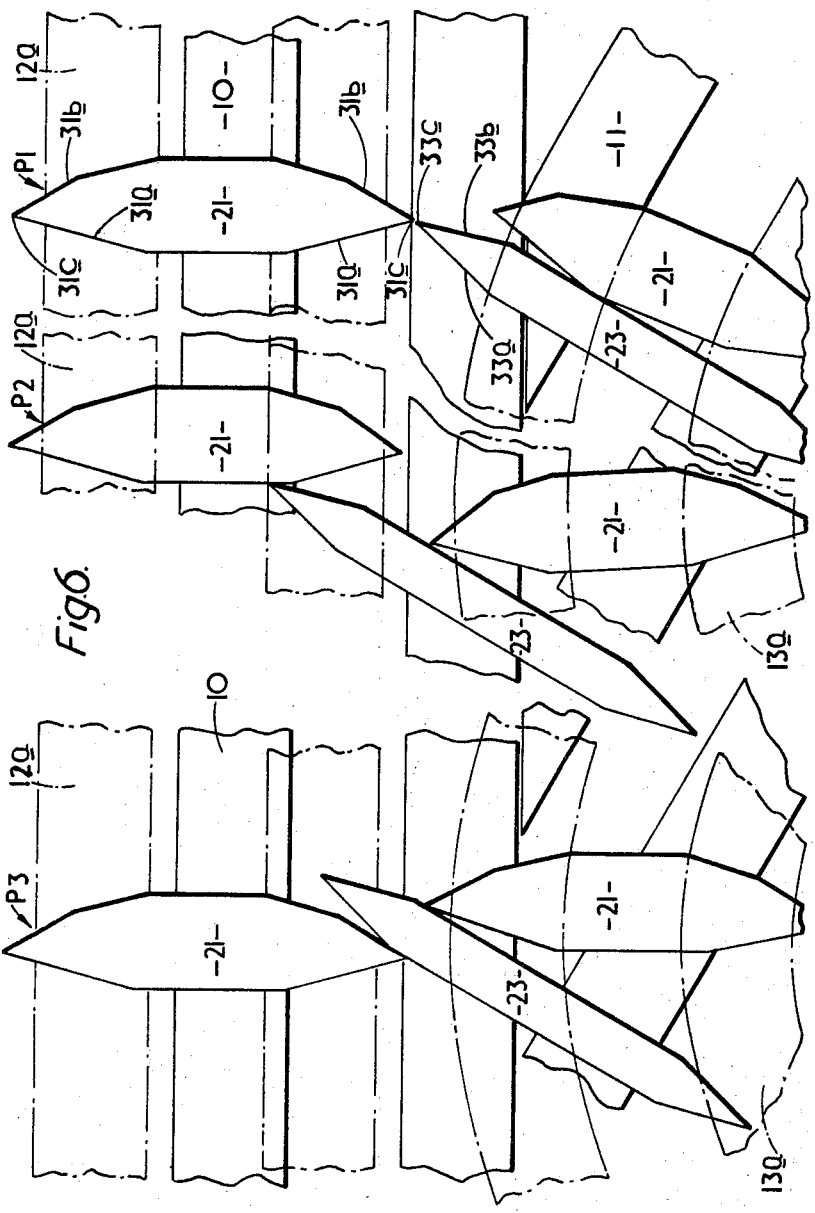
FIGURES 6 and 7 are plan views of a trolley driving abutment and two pairs of dogs associated one with each of two conveyor elements, the two figures illustrating two successive stages in the transference of a trolley driving abutment from the control of one conveyor element as the associated trolley approaches the junction point depicted in FIGURE 5.
Figure 7:
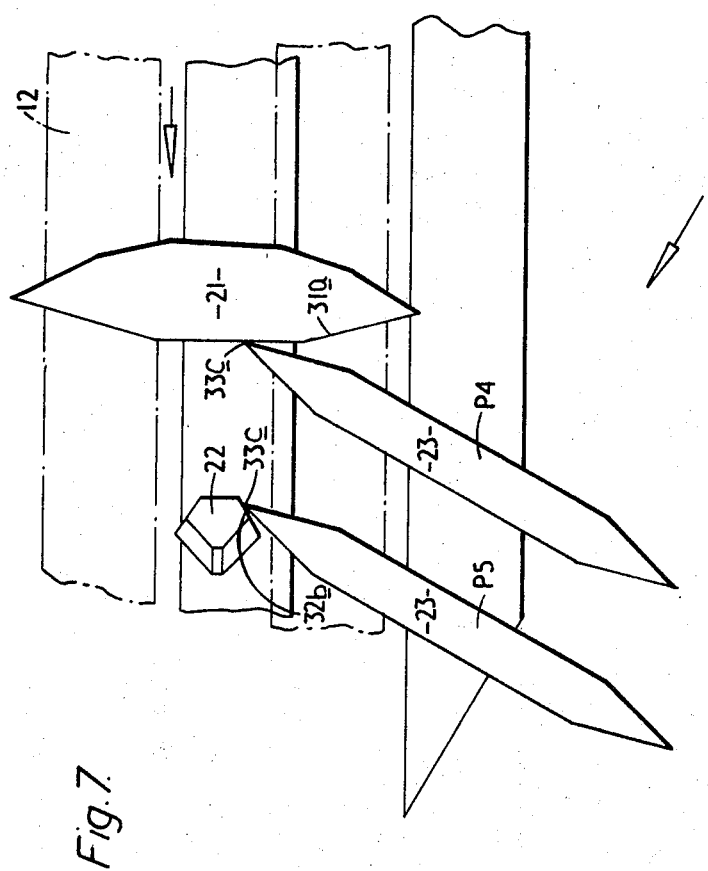

Such inclined and forwardly and rearwardly directed faces of the lateral sides 31, 32 and 33 of the two dogs and of the driving abutment, serve effectively to prevent the lateral side of a trolley driving abutment 23 becoming jammed against the lateral side of either a retarding dog of a driving dog during the transference of a trolley from the control of one conveyor chain to the other at the junction point J where the two trolley tracks 10, 11 converge in a manner which will now be explained with reference to FIGURES 5 to 7, in reference to a trolley which is being advanced along branch track 11 towards the junction point J and which is required to be transferred to the main trolley track 10.

For this purpose in the direction of convergence between the two tracks, as denoted by the arrow in each of FIGURES 5 to 7, the tracks 12a and 13a, which respectively support the conveyor elements 12, 13 are staggered in a direction away from one another relative to their associated trolley tracks 10, 11 by a distance such that approaching the point of convergence between the two trolley tracks, the opposed lateral sides 31 of the driving dogs 21 associated with each conveyor chain 12, 13 are relatively spaced by a distance less than the transverse dimension of a trolley driving abutment bar 23. Such an arrangement permits of the driving abutment of a trolley which is being advanced along branch track 11, being brought into engagement with the driving dog 21 of the conveyor element 12 of main trolley track 10.

If a branch conveyor element 13 is moving faster than main conveyor element 12, the driving abutment 23 of a branch conveyor trolley may be expected to catch up with the driving dog 21 of a pair of dogs of the main conveyor element 12 and it may, in fact, happen that the sharp lateral projection 33c of trolley driving abutment 23 engages directly with the sharp projection 31c of the adjacent lateral side of this relatively slower advancing driving dog 21 on main conveyor element 12, so that the parts then have the position P1 depicted in FIG. 6. Under these circumstances by reason of the sharp configuration as above defined of the edges 31c, 33c and by reason of the provision of the relatively inclined forward and rearwardly directed faces 31a, 31b, on the so engaged dog 21 and the similarly disposed faces 33a and 33b on the adjacent lateral side of abutment 23, jamming between the lateral sides of abutment 23 and dog 21 of conveyor element 12 will not happen. Instead, either the forwardly directed lateral face 33a or face 33b thereof will respectively engage with adjacent faces 31b or 31a respectively of a main conveyor chain dog 21; and with this moving slower than abutment 23 it can be expected that the parts will assume the position depicted at P2 of FIG. 6.

If, however, the relative position of abutment 23 and dog 21 on conveyor element 12 is such that the abutment overlaps in a lateral sense with the rear side of dog 21 before engaging therewith the parts will afterwards initially occupy the relative position depicted at P3 in FIG. 6.

In this latter case as conveyor element 13 is moving faster than conveyor element 12, the trolley driving abutment 23 will engage as shown in FIG. 3 with the rear downwardly and forwardly inclined face 21a of driving dog 21, so as to pass therebeneath into the position depicted in FIG. 2 and shown in plan in position P4 in FIG. 7, so that the abutment 23 now extends between the two dogs of a pair of dogs for advancing under the control thereof.

It may, however, happen that at the position of convergence, trolley driving abutment 23 which is being advanced by the conveyor element 13 associated with the branch trolley track 11, overlaps in a lateral sense with the main track conveyor element 12 at a position laterally opposite to a lateral side of a retarding dog 22, that the sharp projection extremity 33c engages with the adjacent lateral side of such retarding dog. If this happens, jamming of the driving abutment 23 against the lateral side of dog 22 is prevented by the provision on each lateral side of dog 22 of the aforementioned relatively converging lateral side faces 32a and 32b, which as shown in position P5 of FIG. 7, respectively ride over the laterally directed faces 33b and 33a of the adjacent lateral side of abutment 23.

Thus, the present invention effectively avoids any jamming of the lateral sides of the trolley driving abutment against the lateral sides of the driving or retarding dogs at the position of transfer of a trolley from the control of one conveyor element to the control of another.

In the event that at the position of convergence approaching junction J, the abutment 23 of a trolley overlaps with the forward side of a retarding dog 22 of a relatively faster advancing conveyor element, the forwardly directed face 22a of dog 22 which is inclined downwardly in a rearward direction, as shown in FIG. 3, will ride over the trolley abutment 23 in the manner depicted in FIG. 3, so as again to permit of the abutment finally extending between the two dogs of each pair of dogs in the manner depicted in FIG. 2.

I claim:

1. A conveyor of the kind including a pair of trolley supporting tracks which converge at a junction point, a plurality of wheeled trolleys advanceable along said tracks, a powered conveyor element associated with each trolley supporting track and provided at intervals along its length with pairs of dogs, each comprising a rearmost driving dog and a foremost retarding dog respectively engageable with the rearwardly and forwardly directed faces of a driving abutment extending between the two dogs of a pair of dogs and mounted on each trolley to provide for controlled advancement of the trolleys by their associated conveyor element, the two dogs in each pair being displaceable relative to their associated conveyor element in a direction to permit of the driving abutment of a trolley being transferred at the junction point from the control of a pair of dogs of the conveyor element associated with one trolley supporting track to the control of a pair of dogs of a conveyor element associated with the other trolley supporting track, characterised in that the retarding dogs in addition to the driving dogs and the trolley driving abutment are each formed on their laterally directed sides with both forwardly and rearwardly directed abutment faces, which in a direction away from a vertical plane extending longitudinally and centrally of the associated trolley track are respectively inclined in a rearward and a forward direction so that the abutment faces of each of said lateral sides merge directly into one another to present a sharp guiding extremity intermediate the so merging forwardly and rearwardly directed abutment faces.

2. A conveyor according to claim 1 and wherein the retarding dogs are formed as integral portions on the lower ends of supporting stems, characterised in that abutment faces on the laterally directed sides of the retarding dogs are constituted by projections of triangular shape, as viewed in plan, the projections being formed integrally with the stems carrying the retarding dogs.

References Cited

UNITED STATES PATENTS 3,353,500  11/1967  Orwin _____ 104—172

ARTHUR L. LA POINT, *Primary Examiner.*

D. F. WORTH, *Assistant Examiner.*

U.S. Cl. X.R.

104—178